United States Patent [19]

Miyamoto et al.

[11] 4,440,827

[45] Apr. 3, 1984

[54] PROCESS FOR PRODUCING RECORDING PAPER FOR INK JET RECORDING AND OPTICAL BAR CODE PRINTING

[75] Inventors: Shigehiko Miyamoto, Kamagaya; Yoshinobu Watanabe, Matsudo, both of Japan

[73] Assignee: Mitsubishi Paper Mills, Ltd., Tokyo, Japan

[21] Appl. No.: 465,189

[22] Filed: Feb. 9, 1983

Related U.S. Application Data

[63] Continuation-in-part of Ser. No. 334,380, Dec. 24, 1981, abandoned.

[30] Foreign Application Priority Data

Dec. 25, 1980 [JP] Japan ............................... 55-184682

[51] Int. Cl.[3] .......................... B32B 5/16; B05D 3/02; B05D 3/12; G01D 15/34

[52] U.S. Cl. ................................ 428/327; 346/135.1; 427/366; 427/391; 428/342; 428/452

[58] Field of Search ..................... 346/135.1; 427/391, 427/366; 428/327, 342, 452

[56] References Cited

U.S. PATENT DOCUMENTS

| | | | |
|---|---|---|---|
| 4,168,845 | 9/1979 | Oeda et al. | 346/135.1 X |
| 4,252,601 | 2/1981 | Ceintrey | 346/135.1 X |
| 4,269,891 | 5/1981 | Minagawa | 346/135.1 |
| 4,272,569 | 6/1981 | Shaw et al. | 427/391 X |

*Primary Examiner*—Michael R. Lusignan
*Attorney, Agent, or Firm*—Cushman, Darby & Cushman

[57] ABSTRACT

In producing a recording paper having, on the surface of a support, a coating layer comprising inorganic pigment and aqueous polymeric binder, a recording paper giving a high color density of image, a clear color tone of image and a high resolution and suitable for multicolor recording was obtained by preparing said coating layer by twice or more repeating a step which comprises coating a coating color prepared by mixing 100 parts by weight of said inorganic pigment containing 50–100 parts by weight of synthetic silica with 2–18 parts by weight of said aqueous polymeric binder in an amount of 2–9 g solid/$m^2$ per one side of the support by one run of coating procedure and then drying the coating color.

13 Claims, No Drawings

PROCESS FOR PRODUCING RECORDING PAPER FOR INK JET RECORDING AND OPTICAL BAR CODE PRINTING

CROSS-REFERENCE TO RELATED APPLICATIONS

This application is a continuation-in-part of U.S. patent application Ser. No. 334380 filed Dec. 24, 1981 now abandoned.

BACKGROUND OF THE INVENTION (1) Field of the Invention

This invention relates to a process for producing recording papers such as ink jet recording paper, optical bar code printing paper and the like.

(2) Description of the Prior Art

Having various characteristic features such as high-speed printability, low noisiness, great versatility of recorded pattern, easiness of multi-color printing and so on, ink jet recording process has held an important position in the recent years in various fields including information instruments. Further, the image formed by the multi-color ink jet process is by no means inferior to that formed by the usual multi-color printing process. In addition, multi-color ink jet process necessitates no use of printing plate and therefore is less expensive than multi-color printing by the usual process using printing plate, so far as the number of prints to be made is small. For these reasons, it is being attempted currently to expand the application of ink jet process even to the field of multi-color printing instead of limiting its application only to the field of recording.

Since art paper and coated paper used in the usual printing processes are very poor in ink-absorbability, the ink remains for a long period of time on their surface after completion of ink jet recording, which can cause damage on the image when the operator touches some part of the apparatus or the recorded surface is rubbed. Further, in the part where the image has a high color density, the large amounts of inks can mix one another before they are absorbed or can flow out of the place. Therefore, the use of these papers in ink jet process is impractical.

A recording sheet which can be used in ink jet process has to satisfy the following requirements simultaneously. Thus, it must give a clear image of high color density; it must rapidly absorb the ink enough to prevent the flow-out of ink; and in addition it must suppress the diffusion of ink dot towards the horizontal direction on its surface in order to enhance the resolution.

However, as is self-evident, there is such a relation between the ink-absorbability and the ink diffusion characteristics to the horizontal direction relating to resolution that an enhancement of absorbability results in an increase in diffusion to horizontal direction and a control of diffusion to horizontal direction results in an decrease in absorbability. With the aim of solving these problems, control of the sizing property of paper or incorporation of filler having a great specific surface area such as clay, talc, calcium carbonate, urea-formaldehyde resin or the like at the time of paper-making is practised actually, and products having a certain extent of adaptability to ink jet are manufactured by these techniques. However, most of these products cannot give an image having a clear color tone and cannot give an image so attractive in appearance as that obtained by usual multi-color printing such as offset printing process, even though they may partially fulfil the above-mentioned adaptabilities to ink jet. For example, an ink jet recording paper coated with a pigment of high ink-absorbability such as non-colloidal silica powder is disclosed in Japanese Patent Application Kokai (Laid-Open) No. 51,583/80, and an optical bar code printing paper coated with finely powdered silica is disclosed in Japanese Patent Publication No. 790/78. The silica powders used in these techniques require to use a large amount of binder to bond them. For example, as is mentioned in Japanese Patent Application Kokai (Laid-Open) No. 51,583/80, so large an amount as 20-150 parts of binder must be used per 100 parts of silica. An increased amount of binder causes the occurrence of many minute cracks in the dried coating layer, which decrease the resolution because ink runs along the cracks.

On the other hand, in the optical bar code printing paper of Japanese Patent Publication No. 790/78, 5-20 parts of binder is used per 100 parts of silica. Generally, resolution can be improved by increasing the amount of silica coated, and accordingly the amount of silica coated must be 10 g/m$^2$ or more in order to obtain a sufficient resolution. However, when the binder is used only in an amount of 5-20 parts, the silica can readily peel off from the paper layer so that a coating layer giving a sufficient resolution cannot be obtained. That is to say, there is a tendency that the resolution, important to the adaptability to ink jet, decreases whether the proportion of binder is increased or the amount of coating is decreased.

BRIEF SUMMARY OF THE INVENTION

In view of above, the present inventors conducted elaborated studies on the amount of binder, the amount of coating and the method of coating with the aim of obtaining an ink jet recording paper or an optical bar code printing paper excellent in resolution. As the result, they succeeded in decreasing the amount of binder while maintaining the bonding force, and thereby obtaining a recording paper having a high resolution power.

Thus, this invention provides a process for producing a recording paper having, on the surface of a support, a coating layer comprising an inorganic pigment and an aqueous polymeric binder characterized in that said coating layer is obtained by twice or more repeating a coating step. Each step comprises coating a coating color prepared by mixing 5-18 parts by weight of said polymeric binder with 100 parts by weight of said inorganic pigment containing 50-100 parts by weight of synthetic silica in an amount of 2-9 g solid/m$^2$ per one side of the support and then drying it.

DETAILED DESCRIPTION OF THE INVENTION

It was found that, when the amount of aqueous binder in the coating layer is 5-18 parts by weight based on the pigment, the bonding force is insufficient and the coating layer peels off from the paper surface so that the product is practically unusable if 10 g/m$^2$ or more of coating layer is produced per one side by one run of coating procedure, while a sufficient bonding can be achieved with the above-mentioned amount of binder if the amount of coating per one run of coating procedure is 9 g/m$^2$ or less. Though the reason for this phenomenon is not yet fully elucidated, it is considered that the larger the amount of coating by one run of coating procedure, the larger the extent of binder migration becomes, and thus the weaker the bonding strength becomes.

The synthetic silica used in this invention is called finely powdered silica, too, and includes finely powdered silicic acid anhydride, hydrous silicic acid, calcium silicate and aluminum silicate. The main processes for their production are classified into the following three processes:

(1) Dry process (thermal decomposition of silicon tetrachloride);

(2) Wet process (formation of precipitate with sodium silicate and an acid, carbon dioxide, an ammonium salt, aluminum sulfate, or the like); and (3) Aerogel process (heat-treatment of silica gel and an organic liquid such as alcohol in an autoclave). The finely powdered silica produced by dry process has a refractive index of 1.55; that by wet process has a refractive index of 1.45–1.46; that by aerogel process has a refractive index of 1.45–1.46; and calcium silicate has a refractive index of 1.45–1.47.

In this invention, said synthetic silica may be used alone as the inorganic pigment. However, it is also allowable to use said synthetic silica in combination with other inorganic pigment. As the pigment which can be used in combination with synthetic silica, the pigments conventionally used for coating a paper and the inorganic fine powders conventionally used for improving a writing property can be referred to. Their examples include kaolinite clay, ground calcium carbonate, precipitated calcium carbonate, titanium oxide, barium sulfate, talc, zinc oxide, fine glass powder, powdered silica, diatomaceous earth, alumina, calcium silicate, magnesium carbonate, colloidal silica and the like.

According to the study of the present inventors, the writing property with pencil can be improved to a particular extent without losing the adaptability to ink jet and particularly the clarity of multi-color record image by selecting at least one writing property-improver composed of an inorganic fine powder having a refractive index of 1.44–1.55 as said pigment to be used in combination with synthetic silica. Though the reason for this fact is not yet fully elucidated, it is considered that, since refractive index of synthetic silica is roughly in the range of 1.45–1.55 though it may somewhat vary depending on the process of its production as has been mentioned above, selection of a writing property-improver having a refractive index falling in the same range as above, to be used in combination therewith, enables one to eliminate the excessive scattering of light, to decrease the feeling of opaqueness and to improve the writing property while maintaining the clarity in the color of ink.

As the inorganic powder having a refractive index of 1.44–1.55, used as the writing property-improver, fine glass powder, powdered silica, diatomaceous earth, alumina, magnesium carbonate, colloidal silica and the like can be referred to, among which fine glass powder, powdered silica, diatomaceous earth and colloidal silica composed mainly of silica are particularly preferable.

The content of said writing property-improver in the inorganic pigment is 20–50 parts by weight per 100 parts by weight of the latter. If it is less than 20 parts by weight, the writing property is poor. If it exceeds 50 parts by weight, color-formability is poor and ink-absorbability is also inferior. The ratio of writing property-improver to synthetic silica is in the range of 5:95 to 50:50 and preferably in the range of 15:85 to 50:50.

The studies of the present inventors have revealed that ink-absorbability, clarity of color tone and resolution (degree of diffusion of ink dot to horizontal direction), all important to ink jet recording sheet, can be improved with a particularly good balance by adding, to the coating color, 15–30 parts by weight of non-film-forming plastic particle (which would not form a film at ambient temperature) having a particle size of 0.02–0.8 micron to 100 parts by weight of inorganic pigment. Preferable examples of said non-film-forming plastic particle include styrene polymers such as polystyrene, polymethylstyrene, polymethoxystyrene, polychlorostyrene and the like; polyolefins and polyhaloolefins such as polyvinyl chloride, polyvynylcyclohexane, polyethylene, polypropylene, polyvinylidene chloride and the like; and polymers of the esters of $\alpha,\beta$-ethylenically unsaturated acids such as polymethacrylates, polychloroacrylates, polymethyl methacrylate and the like. Copolymers obtained by copolymerizing 2 or more kinds of known monomers can also be used. Among the above-mentioned non-film-forming plastic particles, particularly preferable are polymers having a particle size of about 0.02–0.8 micron obtained by emulsion-polymerizing one or more kinds of vinyl monomer(s) such as styrene or other aromatic vinyl monomers. Such polymers are insoluble in said aqueous polymeric binder and their particle have a shape of ellipsoid. As has been mentioned above, said non-film-forming plastic particle is used in an amount of 15–30 parts by weight per 100 parts by weight of inorganic pigment. If it is less than 15 parts by weight, the effect of improving resolution cannot be expected. If it exceeds 30 parts by weight, ink-absorbability is inferior.

As said aqueous polymeric binder, there can be used starches such as oxidized starch, etherified starch, esterified starch, dextrin and the like; cellulose derivatives such as carboxymethyl cellulose, hydroxyethyl cellulose and the like; casein, gelatin, soybean protein, polyvinyl alcohol and their derivatives; latices of conjugated diene polymers such as maleic anhydride resin, styrene-butadiene copolymer, methyl methacrylate-butadiene copolymer and the like; latices of acrylic polymers such as polymers and copolymers of acrylic ester or methacrylic ester; latices of vinyl polymers such as ethylene-vinyl acetate copolymer and the like; latices of modified polymers obtained by modifying these various polymers with a monomer having a functional group such as carboxyl group; thermosetting synthetic resin adhesives such as melamine resin and the like; and so on.

These binders are added to pigment in an amount of 5–15 parts by weight per 100 parts by weight of the latter.

Optionally, dispersing agent for pigment, thickener, fluidity modifier, defoaming agent, antifoaming agent, moldreleasing agent, colorant and the like may additionally be added appropriately, unless they injure the characteristic properties of recording paper.

As the coating machine used in this invention, those conventionally used in the production of pigment-coated paper, such as blade coater, air knife coater, roll coater, brush coater, curtain coater, champflex coater, bar coater, gravure coater and the like, are all usable.

After the coating, drying is carried out by the usual drying means such as gas heater, electric heater, steam heater, hot air heater or the like, whereby a coated sheet is obtained.

According to this invention, the amount of coating per one run of coating and drying is limited to a range of 2–9 $g/m^2$ per one side. It is necessary to make the total amount of coating 10 $g/m^2$ or more and preferably 10–25 $g/m^2$ by twice or more repetition of the coating and drying procedures while limiting the amount of coating per one run to 2–9 $g/m^2$ on the same surface.

As the support, papers subjected to an appropriate extent of sizing, unsized paper, thermoplastic synthetic resin films and the like can be used without any particular restriction. As the thermoplastic synthetic resin film, polyester, polystyrene, polyvinyl chloride, polymethyl methacrylate, cellulose acetate and the like are usually employed. A sheet after merely forming a coating layer on a support is inferior in smoothness and resolution. Further, the image formed thereon by multi-color recording using ink jet is yet unsatisfactory in attractiveness of appearance, and a sufficient strength of coating layer cannot be obtained with the smallest amount of binder. The finish of ink jet image can be improved by passing, after the above-mentioned coating and drying steps, the sheet having a coating layer through roll nip while heating and pressing it by means of super calender, gloss calender or the like, and thereby giving a smoothness to its surface and a strength to the coating layer. Super calender is operated at a relatively high pressure of about 200 kg/cm and at a steel finishing roll temperature of about 70° C. For finishing paper surface with gloss calender, a paper is subjected to abrasive finishing under a temperature condition enough to realize a temporary plastic state on the paper surface and then the coating layer is pressed against a drum for the sake of finishing. In general, the operating pressure of gloss calender is about 90 kg/cm which is lower than that of super calender, and the operating temperature of gloss calender is as high as about 150° C. For this reason, the processing with super calender compresses and makes denser the coating layer and therefore somewhat lowers the ink-absorbability which is one element of adaptability to ink jet. Contrarywise, the processing with gloss calender causes a temporary plastic state in the surface layer and thereby gives a high quality of finish without excessively compressing the substrate. Accordingly, gloss calender gives a more bulky coating layer, which is desirable for the object of this invention because the bulkiness yields a greater ink-absorbability.

In the case of using non-film-forming plastic particle, it is necessary that the temperature realized in coating layer upon the processing with super calender, gloss calender or the like is not higher than a temperature close to the glass transition temperature of the non-film-forming plastic particle used in the coating layer. If the treatment is carried out at a temperature of 30° C. or more higher than said glass transition temperature, fusion and film-formation of the non-film-forming particle progresses even though a smoothness can be obtained, and this results in a decrease in ink-absorbability which is one important element of adaptability to ink jet.

This invention will be explained with reference to the following examples in no limitative way. In the examples, part and % mean part by weight and % by weight.

The methods for measuring various properties mentioned in the examples will be illustrated below.

(1) INK ABSORPTION SPEED

The time period (seconds) from the instant when 0.0006 ml of an ink drop of aqueous ink for ink jet was attached to the surface to the moment when the ink drop had completely been absorbed was measured by means of microscope. It is preferable that the ink absorption speed is 3 seconds or shorter.

(2) COLOR VIVIDNESS (REPRODUCTIVITY)

Four colors of aqueous inks, cyan magenta, yellow and black, were typed by means of an ink jet apparatus, and clarities of the colors were evaluated with the naked eye. The clarity increases as the mark turns from x to Δ and further to ○. A paper giving a color clarity of Δ or above can be used as an ink jet paper without any problem.

(3) STRENGTH OF COATING LAYER

Surface strength of coating layer was evaluated by printing a sample with an ink having a designated tack by means of RI Printability Tester (manufactured by Akira Seisakusho) and visually examining the peel of coating layer on the surface of sample. The strength of coating layer becomes weaker as the mark turns from ○ to x.

(4) RESOLUTION

An ink drop of aqueous ink for ink jet, having a diameter of 100 μm, was attached to the surface of sample. After the ink had been absorbed, the area marked by the ink drop was measured, from which the diameter (μm) was calculated. A smaller diameter means a better resolution. Usually, a paper giving a diameter of 350 μm or less can be used as an ink jet paper without any problem. An ink jet paper of which a particularly high resolution is required should give a diameter of 250 μm or less, preferably.

EXAMPLES 1-5

One hundred parts of synthetic silica (Vitasil #1500, manufactured by Taki Kagaku) was dispersed into 300 parts of water to obtain a slurry having a synthetic silica concentration of 25%. Then 100 parts of 10% aqueous solution of polyvinyl alcohol (PVA 117, manufactured by Kuraray Co., Ltd.) was added thereto and thoroughly stirred to prepare a coating color having a synthetic silica concentration of 20%.

The coating color was coated on a coating base having a basis weight of 63 $g/m^2$ and a Stoechigt sizing degree of 20 seconds, provided that the amount of coating per one side and the number of repetition of coating were as shown in Table 1, and the coating was carried out by means of air knife coater. After the coating, the sample was dried and then its surface was smoothed by means of super calender to obtain a recording paper.

TABLE 1

| No. | Amount of coating, 1st time ($g/m^2$) | Amount of coating, 2nd time ($g/m^2$) | Amount of coating, 3rd time ($g/m^2$) |
|---|---|---|---|
| Example 1 | 2 | 5 | — |
| Example 2 | 5 | 5 | — |
| Example 3 | 8 | 5 | — |
| Example 4 | 7.5 | 7.5 | — |
| Example 5 | 5 | 5 | 5 |
| Comparative Example 1 | 11 | — | — |
| Comparative | 13 | — | — |

TABLE 1-continued

| No. | Amount of coating, 1st time (g/m²) | Amount of coating, 2nd time (g/m²) | Amount of coating, 3rd time (g/m²) |
|---|---|---|---|
| Example 2 | | | |
| Comparative Example 3 | 15 | — | — |

The adaptabilities to ink jet of these recording papers were measured to obtain the results shown in Table 2.

It is understandable from Table 2 that the samples of Examples 1-5 where coating was repeated twice or more with coating amount per one run of 2-9 $g/m^2$ are good in both resolution and bonding property.

TABLE 2

| Sample | Item | |
|---|---|---|
| | Resolution (μm) | Strength of coating layer |
| Example 1 | 180 | O |
| Example 2 | 160 | O |
| Example 3 | 155 | O |
| Example 4 | 150 | O |
| Example 5 | 150 | O |
| Comparative Example 1 | 160 | x |
| Comparative Example 2 | 153 | x |
| Comparative Example 3 | 151 | x |

EXAMPLES 6-8

Eighty parts of synthetic silica (Vitasil #1500, manufactured by Taki Kagaku) was mixed with 20 parts of glass powder (CCF-325, manufactured by Nippon Glass Fiber) to obtain 100 parts of an inorganic pigment. To 100 parts of the inorganic pigment was added a varied amount, shown in Table 3, of 20% aqueous solution of polyvinyl alcohol (PVA 105, manufactured by Kuraray Co., Ltd.), after which it was diluted with water to obtain a coating color having a concentration of 20%.

The coating color was coated to a coating base by means of air knife coater, provided that the amount of coating in the first time of coating was 6 $g/m^2$ per one side. After drying it, it was again coated and dried similarly, provided that the amount of coating in the second time of coating was 7 $g/m^2$. Then its surface was smoothed by means of super calender to obtain a recording paper.

For comparison, the samples subjected only to the first time of coating were also finished similarly.

TABLE 3

| No. | Amount of PVA (solid) per 100 parts of inorganic pigment (parts) | Amount of coating, first time (g/m²) | Amount of coating, second time (g/m²) |
|---|---|---|---|
| Comparative Example 4 | 3 | 6 | 7 |
| Example 6 | 5 | 6 | 7 |
| Example 7 | 10 | 6 | 7 |
| Example 8 | 18 | 6 | 7 |
| Comparative Example 5 | 25 | 6 | 7 |
| Comparative Example 6 | 40 | 6 | 7 |
| Comparative Example 7 | 25 | 13 | — |

TABLE 3-continued

| No. | Amount of PVA (solid) per 100 parts of inorganic pigment (parts) | Amount of coating, first time (g/m²) | Amount of coating, second time (g/m²) |
|---|---|---|---|
| Comparative Example 8 | 40 | 13 | — |

The adaptabilities to ink jet of these recording papers were measured to obtain the results shown in Table 4.

TABLE 4

| No. | Ink absorption speed (second) | Color vividness | Strength of coating layer | Resolution (μm) |
|---|---|---|---|---|
| Comparative Example 4 | <0.5 | O | x | 150 |
| Example 6 | <0.5 | O | O | 155 |
| Example 7 | <0.5 | O | O | 162 |
| Example 8 | <0.5 | O | O | 180 |
| Comparative Example 5 | 0.7 | Δ | O | 260 |
| Comparative Example 6 | 1.1 | x | O | 310 |
| Comparative Example 7 | 0.8 | Δ | x | 270 |
| Comparative Example 8 | 1.2 | x | Δ | 320 |

It is understandable from Table 4 that the samples of Examples 6-8 where the total amount of binder was 5-18 parts and the coating was repeated twice are superior to the other samples in both ink absorption speed, color vividness and resolution.

EXAMPLE 9

A mixture of 40 parts by weight of ground calcium carbonate and 60 parts by weight of synthetic silica is dispersed in water together with 0.1 part by weight of sodium polyacrylate. To the resulting dispersed solution is added 5 parts by weight of oxidized starch and then 17.6 parts by weight (dry solid base) of polystyrene plastic pigment LYTRON RX-1259 having an average particle size of 0.5 μm produced by Monsanto Corp. After sufficient agitation there is obtained a coating color having a solid content of 42%.

The coating color is coated on a coating base having a basis weight of 73 $g/m^2$ by means of a coating rod so that an amount of coating becomes 5 $g/m^2$ (dry solid base) and dried for 30 seconds by means of heated air at 100° C. The same coating and drying procedure is repeated once for the same surface so that a total amount of coating becomes 10 $g/m^2$ (dry solid base). Then obtained sample is gloss calendered under the conditions of nip pressure of 30 kg/cm, surface temperature of 100° C. and velocity of 30 m/min. to obtain the recording sheet, the properties of which are shown in Table 5.

TABLE 5

| No. | Inorg. pigment: Org. pigment | Resolution (μm) | Ink absorbing speed (second) | Ink absorbing ability | Strength of coating layer | Color vividness |
|---|---|---|---|---|---|---|
| Example 9 | 100:17.6 | 167 | 0.9 | Good | O | O |

As is seen in Table 5, Example 9 wherein polystyrene particle is used as an organic pigment gives the recording sheet excellent in resolution, ink absorption speed, ink absorbing ability, strength of coating film and color vividness.

What is claimed is:

1. A process for producing a recording paper for ink jet recording and optical bar code printing having, on the surface of a support, a coating layer comprising an inorganic pigment and an aqueous polymeric binder characterized by obtaining said coating layer by twice or more repeating a coating step with the same coating color which comprises coating a coating color prepared by mixing 100 parts by weight of said inorganic pigment containing 50–100 parts by weight of synthetic silica with 5–18 parts by weight of said aqueous polymeric binder in an amount of 2–9 g solid/$m^2$ per one side of the support by one run of coating procedure and then drying the coating color.

2. A process according to claim 1, wherein the content of synthetic silica in 100 parts by weight of inorganic pigment is 65–100 parts by weight.

3. A process according to claim 1, wherein said aqueous polymeric binder is polyvinyl alcohol or oxidized starch.

4. A process according to claim 1, wherein the total amount of coating is made 10–25 g solid/$m^2$ per one side by twice or more repeating the step of coating and drying.

5. A process according to claim 1, wherein the content of at least one writing property-improver selected from inorganic fine powders having a refractive index of 1.44–1.55 in 100 parts by weight of said inorganic pigment is made 20–50 parts by weight.

6. A process according to claim 5, wherein said inorganic fine powder is selected from the group consisting of glass powder, powdered silica and colloidal silica.

7. A process according to claim 1, wherein said coating color contains 15–30 parts by weight of non-film-forming plastic particle having a particle size of 0.02–0.8 micron per 100 parts by weight of said inorganic pigment.

8. A process according to claim 7, wherein said non-film-forming plastic particle is polystyrene plastic pigment.

9. A process according to claim 1, wherein, after twice or more repeating the step of coating and drying, the sheet having a coating layer is treated with super calender or gloss calender.

10. A recording paper obtained by the process defined by claim 1.

11. A recording paper according to claim 10 which is an ink jet recording paper.

12. A recording paper according to claim 10 which is an optical bar code printing paper.

13. A process according to claim 1 wherein the synthetic silica is prepared by (a) thermal decomposition of silicon tetrachloride, (b) formation of a precipitate from sodium silicate and an acidic material, or (c) an aerogel process.

* * * * *